Patented Feb. 26, 1946

2,395,493

UNITED STATES PATENT OFFICE 2,395,493

VULCANIZATION OF CHLOROPRENE POLYMERS

Henry Paul Miller, Akron, Ohio, assignor to The B. F. Goodrich Company, New York, N. Y., a corporation of New York No Drawing. Application May 21, 1943, Serial No. 487,965

7 Claims. (Cl. 260—92.7)

This invention relates to the vulcanization or curing of synthetic rubber compositions embodying plastic rubbery polymers of halogen-substituted butadienes-1,3 such as plastic polymerized chloroprene (2-chloro-butadiene-1,3), and has as its principal object to provide a new class of vulcanizing agents by the use of which such synthetic rubber compositions may be cured efficiently and economically to yield vulcanized products of improved quality.

The vulcanization of plastic polymerized chloroprene (hereinafter sometimes referred to as neoprene, the commercial name for this type of synthetic rubber) is ordinarily accomplished by heating a composition containing the synthetic rubber in admixture with metallic oxides such as zinc oxide and magnesium oxide and with wood rosin or pine tar, to a temperature of about 160 to 320° F. for about 30 to 120 minutes, whereupon the plastic composition is converted into an elastic vulcanized state. The presence of sulfur or a sulfur-liberating compound is not essential for this vulcanization, as it is in the case of natural rubber, but sulfur may be present to accelerate the vulcanization.

While this method of vulcanizing neoprene has been more or less satisfactory, there are many instances, particularly when the material to be vulcanized is a liquid composition such as a neoprene cement, where it is desirable to effect a cure at lower temperatures and in a shorter time than is possible with this known vulcanizing technique. For example, it has not been possible to air cure neoprene cements at room temperature in a few hours except by the further addition of sulfur and expensive vulcanization accelerators to the composition, which additions possess the disadvantage of undesirably staining the final vulcanized composition.

I have now discovered that plastic polymerized halogen-substituted butadienes-1,3 may be rapidly cured at low temperatures to produce non-staining vulcanizates by the use of one or more members of the class consisting of aliphatic polyamines and hydroxy-substituted aliphatic polyamines as the vulcanizing agents. Such amines may be incorporated in solid or liquid compositions comprising such plastic rubbery polymers, which compositions may or may not contain the usual vulcanizing agents such as rosin and metallic oxides, and the compositions then vulcanized. They may be added to neoprene solutions and cements to produce compositions which will air cure in a few hours at room temperature and they may otherwise be used to replace or to supplement the conventional vulcanizing agents for neoprene.

The aliphatic polyamine employed may be any open-chained organic compound consisting of carbon, hydrogen and nitrogen in which the nitrogen is present in amine groups, of which there are at least two, and which may be either primary ($NH_2-$), secondary

or tertiary

amine groups; the said amine groups being attached to carbon atoms present in alkylene groups, that is, bivalent open-chain aliphatic groups having the two free valences attached to different carbon atoms. The term aliphatic polyamine as used herein will be understood to have the foregoing meaning. Any hydroxy substituted polyamine, i. e., an aliphatic polyamine having one or more hydroxyl groups attached to carbon atoms, may also be employed.

The preferred compounds of the class consisting of aliphatic polyamines and hydroxy-substituted aliphatic polyamines for use as vulcanizing agents in this invention are the alkylene polyamines including the alkylene diamines such as ethylene diamine (1,2-diaminoethane), 1,2-diamino propane, 1,3-diamino propane, 1,2,3-triamino propane, 1,4-diamino butane, hexamethylene diamine, 1,10-diamino decane and the like and the polyalkylene polyamines such as diethylene triamine, triethylene tetramine, tetraethylene pentamine, pentaethylene hexamine, dipropylene triamine, tetrabutylene pentamine, triamino triethyl amines, and the like; the hydrocarbon substituted alkylene polyamines including amines in which the hydrocarbon group is attached either to a nitrogen or to an aliphatic carbon atom such as dibutyl ethylene diamine, phenyl triethylene tetramine, triethyl diethylene triamine, 2-amino triethylamine, 1,2-di(ethyl amino) ethane, 1,2-di(dimethyl amino) ethane, 1,3-di(methyl amino) propane and the like; and the hydroxy substituted alkylene polyamines in which the hydroxy group is attached to an aliphatic carbon atom such as 1,2-diamino ethanol, 1,3-di(diethyl amino) propanol, 1,3-diamino propanol and the like. The polyalkylene polyamines such as tetraethylene pentamine are particularly preferred. All these aliphatic polyamines and hydroxy-substituted aliphatic polyamines may be represented by the structural formula

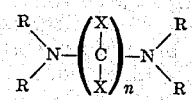

wherein R is hydrogen, a hydrocarbon group or a hydroxy or amino substituted hydrocarbon group X is hydrogen, hydroxy, a hydrocarbon group or a hydroxy or amino-substituted hydrocarbon group and $n$ is an integer preferably greater than 1.

In the practice of the invention one or more of the above-mentioned polyamines is associated with a plastic polymerized chloroprene composition and the composition is then vulcanized. The polyamine vulcanizing agents may be incorporated in neoprene compositions while the synthetic rubber is being worked on a roll-mill or masticated in an internal mixer, and they may be added alone or in admixture with each other or with other compounding ingredients such as pigments, antioxidants, softeners, or other ingredients commonly used in compounding neoprene or in the form of a masterbatch. When the neoprene composition is in the form of a cement or dispersed in water or a solvent, the vulcanizing agents may be simply dissolved or dispersed therein. The vulcanization of the neoprene composition containing the vulcanizing agent may be effected in a heated mold, in open steam, in hot air or, in the event the composition is a solution or cement, simply by allowing the composition to stand at room temperature. The conditions required for vulcanization such as time and temperature will obviously be dependent on the nature of the particular composition to be vulcanized, and are not critical.

The proportions of the polyamine vulcanizing agent to be used may be varied within wide limits. The use of from 0.5 to 5% by weight of the polyamine based on the neoprene is ordinarily sufficient and is preferred, although greater or smaller amounts may desirably be employed in some cases.

In order to illustrate the use of polyamines in the vulcanization of liquid neoprene compositions such as solutions or cements, the following specific example is set forth:

Example I

A rapid air curing neoprene cement useful in coating fabrics, as an adhesive for binding various articles such as fabric, rubbery and plastic materials, leather etc. to each other, and for any other suitable purpose is prepared from a neoprene composition containing the following ingredients:

| | Parts |
|---|---|
| Neoprene G (a plastic polymerized chloroprene) | 100 |
| Magnesium oxide | 4 |
| Zinc oxide | 5 |
| Litharge | 5 |
| Phenyl beta naphthylamine | 2 |
| Gastex carbon black | 5 |

150 parts by weight of the above composition is dissolved in a mixture of gasoline and isopropyl acetate to produce a cement containing 10% by volume of the neoprene composition. 1 part of a 10% by volume solution of tetraethylene pentamine in toluene is then added to 40 parts of the cement. The resulting cement is then applied to a fabric base and the coated fabric allowed to stand at room temperature for only 24 hours whereupon it is found that the neoprene coating is well-vulcanized and tightly adhered to the fabric. The film is clear, free from stain and is strong and elastic. When the cement is applied to an adhesive joint of a composite structure and allowed to air cure for 24 hours at room temperature, strong adhesive bonds are obtained. The cement may also be vulcanized in only 1 hr. if heated to 158° F. or in an even shorter time if heated to higher temperatures. When the aliphatic polyamine is not present in the cement, however, it is insufficiently cured even after 10 days at room temperature or after being heated for 3 hours at 158° F.

Similar ultra-rapid air curing neoprene cements may be prepared when ethylene diamine, diethylene triamine, diamino propanol, dibutyl ethylene diamine and similar aliphatic polyamines and hydroxy substituted aliphatic polyamines are substituted for the tetraethylene pentamine of the above example. Moreover such cements are obtained by the use of other neoprene compositions containing other ingredients than those present in the neoprene composition of the above example, or even when the neoprene contains no added ingredients save the aliphatic polyamine. Thus the presence of magnesium oxide and zinc oxide in the neoprene composition is by no means essential and may be substituted by other ingredients or omitted entirely if desired. Litharge may also be omitted but this is not preferred since it has been found that litharge is a particularly valuable accelerator for the vulcanization with aliphatic polyamines.

In the preparation of such air curing cements it is also obviously possible to employ any volatile solvent for the neoprene composition in place of the mixture of gasoline and isopropyl acetate. For example, benzene; toluene, ethylene dichloride, chlorobenzene, carbon disulfide, trichloroethylene, methyl ethyl ketone or the like or mixtures of these may be used to dissolve the neoprene composition.

The aliphatic polyamine is preferably added either alone or in solution in a solvent to a solution of a neoprene composition, as in the above example, to produce the air-curing cement. Since the polyamine rapidly sets-up or cures the cement greatly increasing its viscosity, it is ordinarily desired to add the polyamine only a short time before the cement is to be used. If the polyamine is added to the cement before it is used and it is desired to prevent gelling and maintain as low a viscosity as possible it is advantageous to include in the cement a material which prevents or retards gelling such as ethyl alcohol, glycerine or other aliphatic alcohols, phenols, organic acids, or monoamines such as diethyl amine or monoethanol amine.

In addition to the use of aliphatic polyamines and vulcanizing agents for neoprene cements, the present invention contemplates the use of such polyamines as vulcanizing agents for any other type of neoprene composition such as those used in the manufacture of hose, belting, tires, tubes and molded goods, neoprene latices for the manufacture of dipped goods and the like. The following example will illustrate the use of polyamines in the vulcanization of a composition suitable for use in tires and molded goods.

Example II

The following ingredients are mixed on a two-roll mixing roll:

| | Parts |
|---|---|
| Neoprene G (a plastic polymerized chloroprene) | 100 |
| Phenyl beta-naphthylamine | 2 |
| Carbon black | 70 |
| Paraffin oil | 5 |
| Thio beta naphthol | 0.5 |
| Lauric acid | 2 |
| Tetraethylene pentamine | 1 |

The resulting composition is then vulcanized in a press for 20 minutes at 287° F. An excellent vulcanizate having high tensile strength and elongation is obtained. It is to be noted that none of the conventional curing agents for neoprene such as metallic oxides and rosin is present in the above composition, the tetraethylene polyamine being responsible for the vulcanization. However, such conventional vulcanizing agents as well as known accelerators for neoprene vulcanization may be present in the composition if desired.

Although the invention has been described with particular relation to the vulcanization of neoprene (plastic polymerized chloroprene), it is also within the scope of the invention to vulcanize any other plastic polymer consisting predominantly of a polymerized halogen-substituted butadiene-1,3 such as plastic polymerized 2-bromo-butadiene-1,3 and copolymers of chloroprene (2-chloro-butadiene-1,3) or 2-bromo-butadiene-1,3 with lesser amounts of other polymerizable compounds such as butadiene-1,3, isoprene, acrylonitrile, styrene and the like. It is also within the scope of the invention to employ polyamines as vulcanizing agents for mixtures of neoprene or other plastic polymers of a halogen-substituted butadiene-1,3 with other plastic rubbery vulcanizable materials such as natural rubber and synthetic rubbers of the type prepared by the polymerization of butadiene-1,3 either alone or in admixture with acrylonitrile, styrene, isobutylene, methyl methacrylate, etc. As illustrated herein the materials to be vulcanized may be mixed with any of the conventional compounding ingredients such as antioxidants, fillers, pigments, softeners, plasticizers and the like.

Other modifications and variations of the invention will be apparent to those skilled in the art and are within the spirit and scope of the invention as defined by the appended claims.

1. The method which comprises vulcanizing plastic polymerized chloroprene in the presence of a polyalkylene polyamine in which the alkylene groups are composed exclusively of carbon and hydrogen.

2. The method which comprises vulcanizing plastic polymerized chloroprene in the presence of tetraethylene pentamine.

3. The method which comprises vulcanizing a plastic polymer consisting predominantly of a polymerized halogen-substituted butadiene-1,3 in the presence of a polyalkylene polyamine in which the alkylene groups are composed exclusively of carbon and hydrogen.

4. An air curing synthetic rubber cement comprising, plastic polymerized chloroprene, a volatile organic solvent therefor and polyalkylene polyamine in which the alkylene groups are composed exclusively of carbon and hydrogen.

5. A composition of matter comprising a plastic polymer consisting predominantly of a polymerized halogen-substituted butadiene-1,3 and, as a vulcanizing agent therefor, a polyalkylene polyamine in which the alkylene groups are composed exclusively of carbon and hydrogen.

6. A vulcanizate prepared by the method of claim 1.

7. A vulcanizate prepared by the method of claim 3.

HENRY PAUL MILLER.